(12) United States Patent
Southworth et al.

(10) Patent No.: US 10,318,986 B1
(45) Date of Patent: Jun. 11, 2019

(54) METHOD AND SYSTEM FOR CURATED PRODUCT MARKETING

(71) Applicant: Thirstie Inc., New York, NY (US)

(72) Inventors: Devaraj Southworth, New York, NY (US); Maxim Razmakhin, New York, NY (US)

(73) Assignee: Thirstie Inc., New York, NY (US)

( * ) Notice: Subject to any disclaimer, the term of this patent is extended or adjusted under 35 U.S.C. 154(b) by 432 days.

(21) Appl. No.: 15/371,209

(22) Filed: Dec. 7, 2016

Related U.S. Application Data

(60) Provisional application No. 62/265,875, filed on Dec. 10, 2015.

(51) Int. Cl.
| | | |
|---|---|---|
| *G06Q 30/02* | (2012.01) | |
| *G06Q 10/08* | (2012.01) | |
| *G06Q 20/10* | (2012.01) | |
| *G06Q 30/06* | (2012.01) | |
| *G06Q 50/12* | (2012.01) | |

(52) U.S. Cl.
CPC ....... *G06Q 30/0253* (2013.01); *G06Q 10/083* (2013.01); *G06Q 20/102* (2013.01); *G06Q 30/0267* (2013.01); *G06Q 30/0613* (2013.01); *G06Q 50/12* (2013.01)

(58) Field of Classification Search
CPC .................................................. G06Q 30/0253
See application file for complete search history.

(56) References Cited

U.S. PATENT DOCUMENTS

| | | | | |
|---|---|---|---|---|
| 2008/0127314 | A1* | 5/2008 | Rowley | H04L 9/3273 726/5 |
| 2013/0152155 | A1* | 6/2013 | Donfried | G06F 21/00 726/1 |

FOREIGN PATENT DOCUMENTS

| | | | | |
|---|---|---|---|---|
| WO | WO-0129734 A2 * | 4/2001 | | G07F 5/18 |

* cited by examiner

*Primary Examiner* — A. Hunter Wilder
(74) *Attorney, Agent, or Firm* — James P. Demers; Cittone Demers & Arneri LLP

(57) ABSTRACT

A computer-implemented system is provided which performs a method for facilitating the discovery of product choices and the on-demand purchase of regulated products. The system associates a potential consumer with merchants, subject to jurisdictional constraints and consumer preferences, and operates on a network platform.

9 Claims, 4 Drawing Sheets

METHOD AND SYSTEM FOR CURATED PRODUCT MARKETING

RELATED APPLICATIONS

This application claims priority of U.S. provisional application No. 62/265,875 filed on Dec. 10, 2015, the entire contents of which are incorporated herein by reference.

FIELD OF THE INVENTION

This invention relates to a computer-implemented system for facilitating a consumer's discovery of product choices, and for enabling on-demand purchase and product delivery from the most suitable merchants.

BACKGROUND

The widespread adoption of e-commerce methods has enabled sophisticated, real-time use of sales information in marketing goods to consumers, and in managing the logistics of supplies, inventory, and shipping. In connection with marketing goods, for example, it is known to advise the potential buyer of a product, who is viewing the product in a browser window, of related goods bought by other customers who have made the same purchase. Users of Amazon.com®, for example, are familiar with the routine display of products "frequently bought together" with the product under consideration, and with the display "Customers Who Bought This Item Also Bought", followed by a list of products purchased at one time or another by buyers of the product under consideration.

It is also known to monitor a consumer's regular purchase of consumables, and to maintain a shopping list individualized for that consumer. Users of Drugstore.com®, for example, are familiar with the Your List' display of frequently-purchased consumables. It is also known to send reminders to the consumer, via email, that replenishment of regularly purchased goods is likely due, along with a convenient link to the merchant's web site.

Such methods are limited to data mining of past purchase histories of the consumer, and of other consumers who have considered or purchased identical or similar products. Data mining of the latter sort tends to reflect mass tastes and preferences, and is not individualized to the targeted consumer's tastes and preferences. There remains a need for systems and methods that enable consumers to discover new products that might not be linked in a database of past purchases. The present invention meets this need via a learning algorithm which constantly updates explicit indicators of individual consumer preferences, and which also infers likely consumer preferences from indicators of the consumer's social context and browsing and reading habits, as well as the purchase history.

DETAILED DESCRIPTION OF THE INVENTION

The present invention (the "Platform") is directed to the marketing, sale, and delivery of alcoholic beverages in particular. Although a few jurisdictions operate state-owned liquor stores, and the sale of beer is typically permitted in supermarkets and grocery stores, the alcoholic beverage market for wines and spirits is typically served by an array of independently-owned and managed liquor stores. State laws regulating and taxing local sales are common, as are regulations limiting or prohibiting the transportation of liquor across state lines. These factors tend to discourage the formation of e-commerce sites with national reach and distribution in the alcoholic beverage market. The present invention addresses these issues by employing local merchants, operating within the consumer's regulatory and tax jurisdiction, for the delivery of goods purchased through the system of the invention.

The invention, in particular, provides an improvement in the delivery time that consumers experience when ordering beverages. Consumers are enabled, by the system of the present invention, to order desired beverages without the need to shop around to find a merchant with the required inventory and delivery capabilities. By means of embodiments of the present invention, delivery of all desired products to the consumer's home can take place within hours, and in some cases within minutes. In the alcoholic beverage retail sales industry, the invention provides a significant improvement in the efficiency of selecting and purchasing beverages, in the speed of delivery, and in the speed and efficiency of the business process as a whole.

The present invention enables product discovery though curated media (editorial content). In certain embodiments, this provides the consumer with information relevant to the consumer's purchase decisions, including but not limited to information about new products, new mixed drink recipes, how-to articles on bartending and mixology, reviews by authoritative tastemakers of new and existing products, product rankings generated by expert panels or by public surveys, and in-depth articles on beverages of interest to the consumer.

The design herein performs product discovery and delivery through a seamless architecture that allows discovery of relevant products by a user and allows the user to order such relevant products. The present architecture may be employed over a network, such as the Internet, a mobile network or both working in conjunction, preferably having a multitude of client and server devices to service a large user base.

Figure 1:
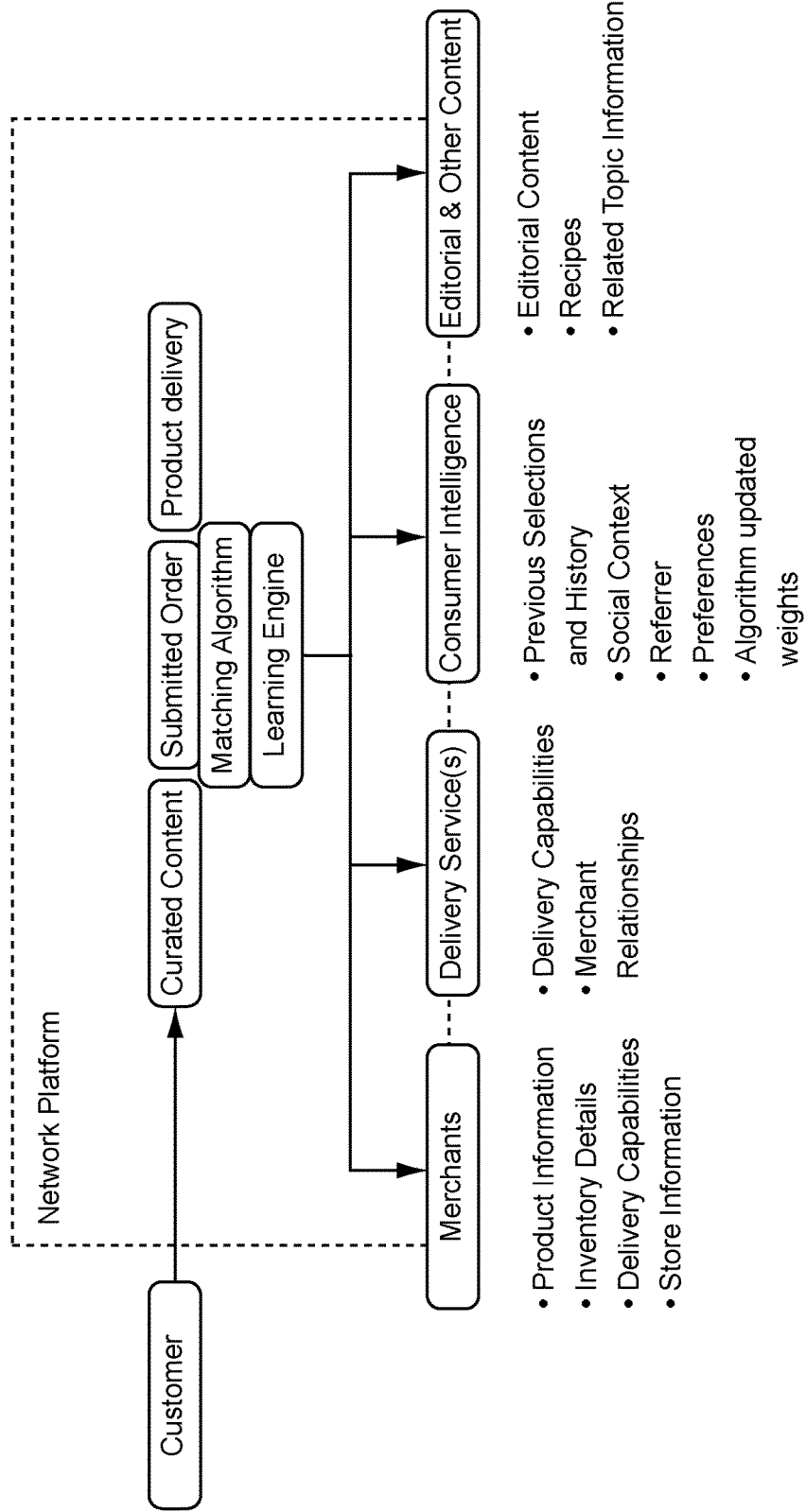
FIG. 1 is a high-level overview of the Platform of the invention.
Figure 2:
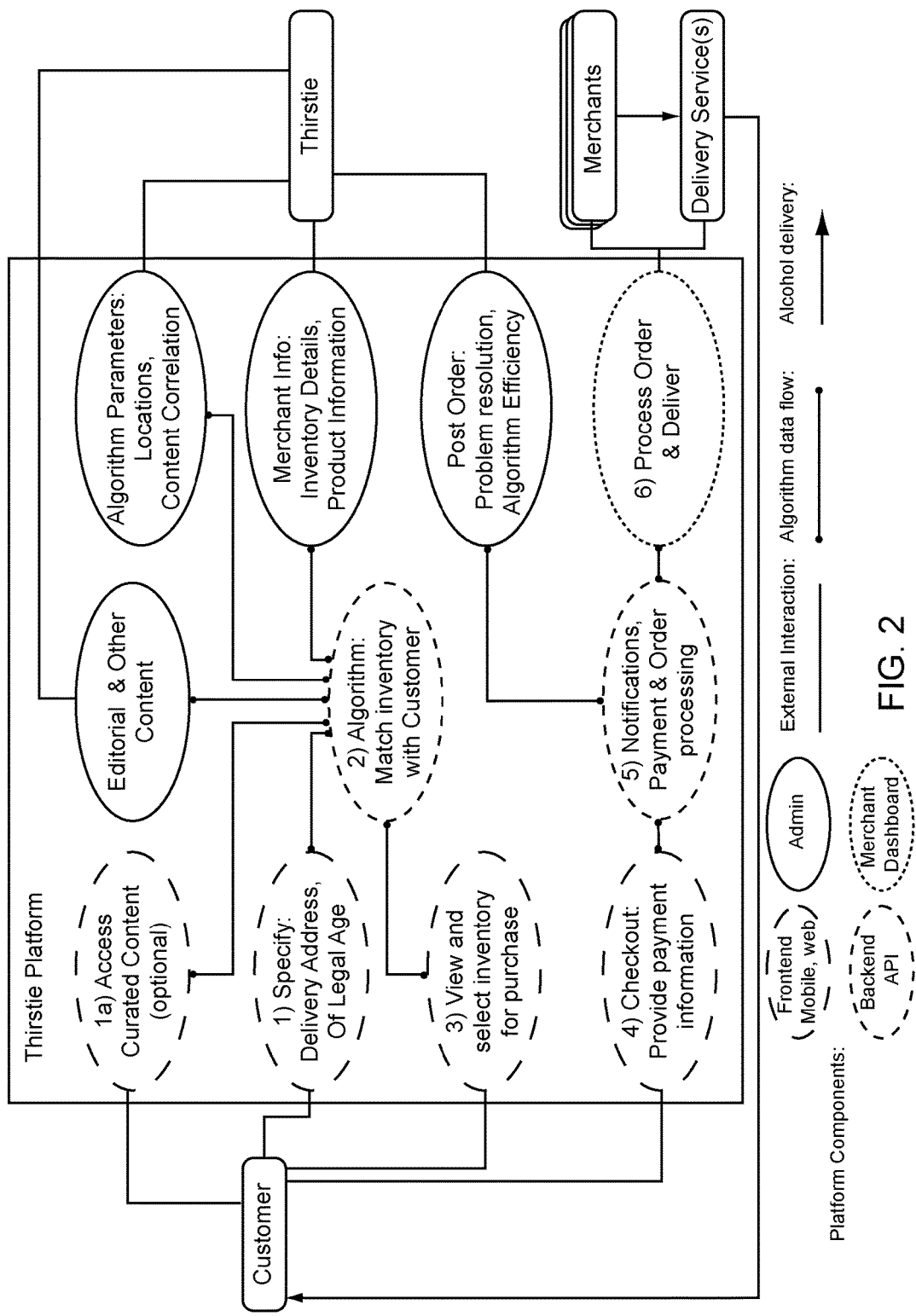
FIG. 2 is a diagram showing the relationships among the Platform components.

Reference is now made to the Figures, in particular FIGS. 1 and 2, which describe the Platform components and the relationships among the Platform components. In embodiments of the present invention, learning and logistics modules implement learning and logistics algorithms, which operate on data parameters that include, but are not limited to, Product parameters, Curated Content parameters, Consumer Intelligence, and Merchant and Delivery Service parameters.

Product parameters include, but are not limited to, Products and Product Types. A Product is a specific brand of alcohol or other regulated product (e.g., Jack Daniel's™ Whiskey, Absolut™ Vodka, etc.) in a specific packaging unit offered to consumers (e.g., 750 ml bottles, fifths, six-packs of 12 oz cans, etc.) A Product Type is a category that relates similar products. Hierarchical categories are classes of product, such as "wine", having sub-categories such as "red wine", "white wine" and "sparkling wine." The hierarchical category "spirits" will have sub-categories such as "vodka", "gin", etc. Descriptive data, including vintage, region of production, and flavor profile, is preferably among the product parameters, especially for wines. Related products and product types may be included among the product parameters. For example, Consumer interest in gin will bring up vodka as a substitute for most cocktails, and in the case of scotch whiskey the system of the invention can showcase a similarly smoky bourbon.

Curated Content Parameters include, but are not limited to, written articles, recipes, product rankings, expert or celebrity recommendations, and the like. An editorial process associates Curated Content with Product Types and/or specific Products. This can be done either by explicitly assigning and storing tags associated with an article of Curated Content, or programmatically, for example by analyzing the frequency of words referencing products or product types. Curated content may be generated by the system owner or operator, or by the users, and/or may be obtained from magazines, newsletters, web sites, and other third-party sources, with proper attribution and payment of any fees needed to secure the right to publish the content. Curated content may also be paid advertising, and may be associated with products being promoted. Paid content is preferably identified as such, in order to maintain the Platform's status among consumers as a trusted source of unbiased information.

Consumer Intelligence comprises two types of data: "first order" data is consumer-derived data explicitly related to Product Types and specific Products, and "second order" data is data from which consumer interest in either Product Types or Products can be inferred. Examples of first order data are the consumer's stated preferences, which the consumer is encouraged to explicitly identify to the Platform.

Another example of first order data is the Referrer. If the consumer is referred to the platform by an external service (such as a search engine or a link on an external website), the referrer may provide information related to specific products or product types. For example, if the user enters "whiskey" in a search engine, this is regarded, initially, as an expression of interest in the Whiskey product. A link from a site dedicated to discussing beer would be treated as an expression of an interest in beer. The Referrer may also be the Curated Content provided by the Platform.

Examples of second order data are Social Context, in which the consumer may be socially associated with other consumers, the preferences of whom permit inferences to be made about the preferences of the consumer; User History, the consumer's history of actual purchases via the Platform, and the consumer's history of viewing curated content. The learning module of the invention can generate a list of a consumer's preferred products and product types that have been inferred from this second order data.

Based on the consumer's behavior while interacting with the Platform, Algorithm Update Weights can be calculated. Relevant consumer behavior includes, but is not limited to, selections, navigation paths, and time spent on content. The Algorithm Update Weights, also referred to herein as "preference parameters", are special parameters that are constantly updated as the consumer interacts with the Platform. By giving consumer-specific weights to the data elements of Consumer Intelligence, the Algorithm Update Weights enable the Platform to better guide the consumer in the future.

Merchant and Delivery Service Parameters include Inventory (a list of Products offered for sale, with advertised prices, for each Merchant who is a participant in the Platform.) The Inventory parameters can be used to derive additional merchant information, such as Product Types and price ranges for each merchant. Other Merchant and Delivery Service parameters include Merchant capabilities (gift wrapping, local delivery, shipping, etc.), associated delivery services used by the merchant and the regions they service, and jurisdictional and other restrictions such as a minimum age for purchase, delivery area restrictions, and days and hours of operation.

The logistics module carries out three sets of tasks: (I) dynamically determining the consumer context, (II) dynamically pairing the consumer with one or more merchants for order fulfillment, and (III) transaction processing. These are set forth in greater detail below.

The first set of tasks, dynamic determination of consumer context, is undertaken upon access of the Platform by the consumer, when consumer preferences and consumer location are acquired. A mobile device generally provides a current location via known geolocation methods, and the area code and exchange number of a land line phone number reveals the customer's geographic region. Access from a computer via a browser can reveal geographic location by means well-known in the art, such as Wi-Fi (MAC address) mapping and IP address tracing. The Platform may request the consumer's consent to share and/or confirm location information. An existing customer will have delivery and billing addresses on record, and that one of these addresses is the present location can be confirmed by any of the means just described.

Based on output from the learning module, editorial or product content based on the consumer's preferences and location may be displayed. As the consumer interacts with the computer-implemented method, the learning module (a) assigns weights to products and product characteristics observed to be of interest to the consumer as the consumer interacts with the method; (b) updates the weights as the consumer shows greater or lesser interest during subsequent interactions with the method; and (c) selects products and content for display to the consumer, based on the updated weights.

For example, if the last selection seemed to be associated with a holiday, and it is close to a holiday now, the Platform may showcase holiday spirits based on the consumer's geographical location. Purchases made on previous instances of an upcoming holiday may be taken into account, and appropriate related content and products may be displayed. If there are current purchases that are more aligned with a personal special event, such as a wedding, the Platform may present recipes and drinks appropriate for special occasions. Seasonal products and recipes may be displayed at appropriate times of the year, e.g. hot rum drinks would be featured in December.

As part of the dynamic determination of consumer context, links based on the displayed content are generated and displayed. For example, display of an article on the history and various versions of the martini may trigger the generation and display of links leading to articles on gin and vermouth, to the product categories, and to specific products within those categories. Preferably, the selection of links takes into account the consumer's preferences (e.g for price range, bottle size, and brand preferences.)

The consumer' location and compliance parameters are requested, or, if available, are retrieved from stored data and presented for confirmation. This includes the delivery address, and whether the consumer is of age in the jurisdiction controlling the delivery address. Many jurisdictions require a person of the mandated minimum age to receive and sign for the delivery of alcoholic beverages.

The Platform also engages in a process referred to herein as "Learning Engine Update". While the consumer is viewing content and clicking on links, the preference parameters are updated using a learning algorithm as described below. As the consumer repeatedly and continuously uses the Platform, and this process is repeated in a continuous cycle, the Platform becomes increasingly knowledgeable about the consumer, and becomes increasingly helpful. For example, if the consumer stays on a recipe page and also clicks on a few different links, the learning engine will infer preferences and weight their intent for this event; and over the long haul will acquire an outline of the consumer's brand and lifestyle choices.

While the Platform is presenting the consumer with his or her selected Curated Content, the learning module is presenting to the consumer options to view and purchase products related to the chosen content, to the known or inferred interests of the consumer, or to new and/or currently promoted products.

While the consumer is interacting with the Platform, the learning module engages in determining criteria for merchant selection and highlighting inventory. If appropriate context is available, the learning module of the invention determines the products and product types to highlight to the consumer, based on Consumer Intelligence data. As noted above, Consumer Intelligence Data comprises first-order data, such as the consumer's stated interest in specific products or types of products, and on the consumer's stated preferences regarding brands and price ranges for various types of products. Second-order data (e.g., social context) includes, for example, the products and types of products preferred by the consumer's social cohort. If the consumer's purchase history is available, the learning module may factor in the product types and products from past purchases. The logistics module acquires from the consumer the mode and timing of delivery that the consumer desires for the contemplated order (e.g., on-demand, scheduled delivery, expedited shipping, gifting.)

The second set of tasks, dynamically pairing the consumer with one or more merchants, comprises selecting one or more Merchants (Eligible Merchants) associated with Delivery Services covering the consumer's delivery address. The list of Eligible Merchants is filtered by a set of yes/no criteria, including but not limited to whether the Eligible Merchant delivers to the consumer's delivery address, whether or not the Eligible Merchant can fulfill the order using the delivery mode selected (e.g., gift orders, scheduled delivery, shipping), and whether or not the Eligible Merchant can timely fulfill the order during its hours of operation.

The learning module then engages in a process of ranking and sorting Eligible Merchants by preference criteria, which may be weighted according to relative importance to the consumer and/or the system owner or operator. Preference criteria include, but are not limited to, which merchant has the largest inventory for the preferred product types, which merchant has the largest inventory for the preferred products, which merchant has the broadest range of prices for preferred product types, which merchant has performed best in the past (e.g., on time deliveries, fewest out-of-stock orders), and which merchant is geographically closest to the delivery address.

The third set of tasks, transaction processing, comprises the steps of receiving the consumer's choices from the presented inventory, conveying the consumer's selections to multiple merchants, enabling the merchant or merchant(s) to choose to fulfill the order, providing a gateway to allow payment to be processed by the merchant, receiving notices of shipping and delivery, and securely storing the consumer's transaction history. The transaction history is preferably encrypted or hashed to protect the consumer's privacy and secure the consumer's personal data.

Figure 3:
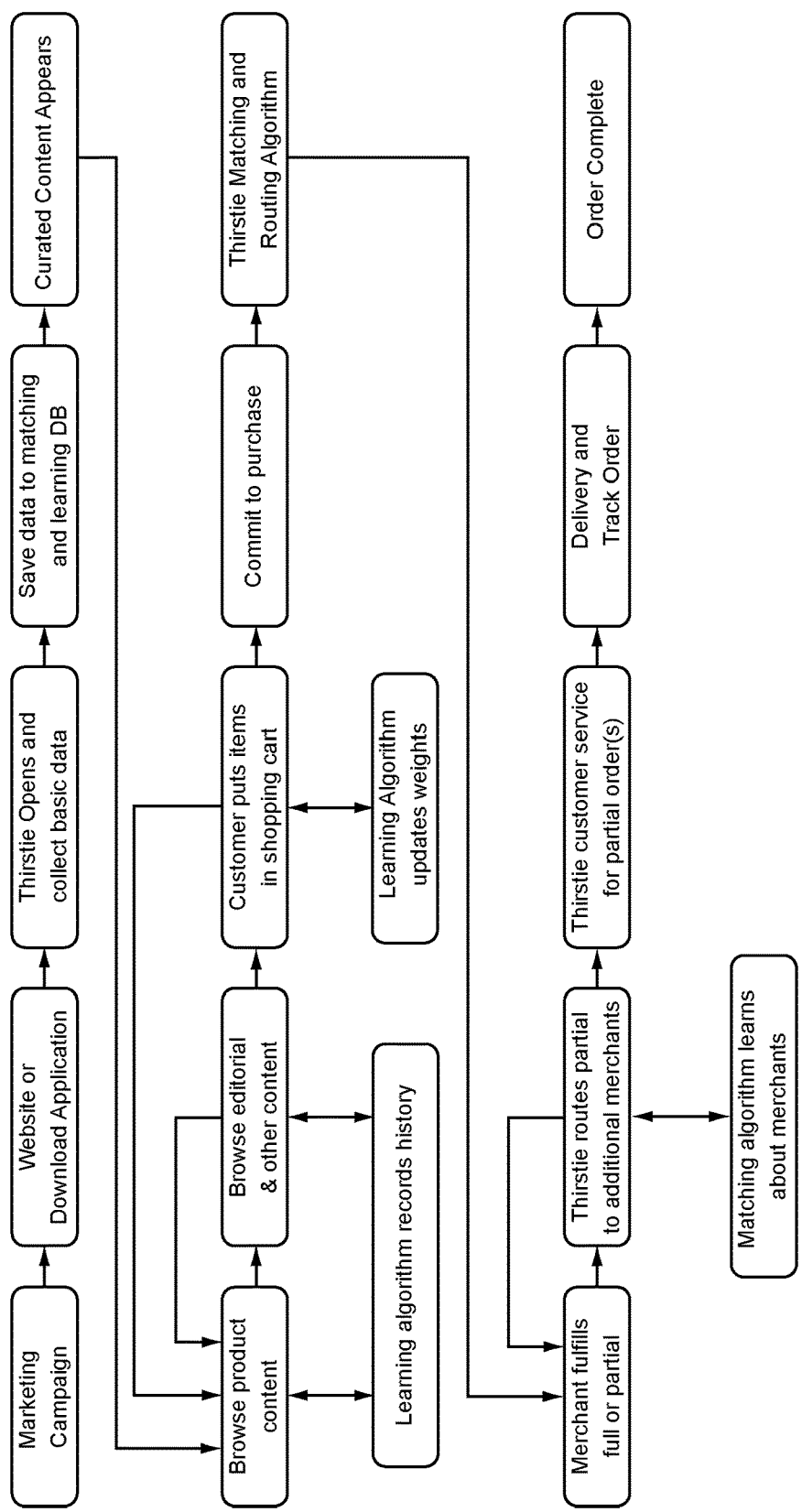
FIG. 3 is a high-level flow chart showing the steps carried out by the algorithms of the invention for a new customer.

Referring to FIG. 3, when a new customer (consumer) first accesses the Platform, the learning algorithm acquires and saves in a database basic data about the consumer, including the consumer's age, the state in which the consumer resides, and one or more of geographic location, phone number, IP address, and device MAC addresses. If the consumer is using a mobile device, the instructions for carrying out the process of the invention may be stored in the form of an application residing in non-volatile computer-readable memory within the device. If the consumer is using a computer, the instructions may be stored in non-volatile computer-readable memory on an Internet-connected server. The learning algorithm uses geographic information; the other identifying data can be used to determine geographic location, and may serve as authentication factors to verify the customer's identity in the future.

Basic customer data such as name, email, address, and any merchant preferences are preferably stored locally on the customer's device or computer. The server may test this information against the server's stored data to authenticate the user.

The Platform displays curated content and product choices to the consumer, based on the consumer's age and geographic information (e.g., the inventory of the nearest merchant(s)). As the consumer selects product descriptions and lifestyle-related editorial content of interest, the learning module records the browsing history in the database, in a record that is associated with the consumer. The consumer selects items for inclusion in a virtual "shopping cart", as is well known in the art. The learning module increases the relative weights assigned to those products, and the relative weights of curated content related to those products, thereby generating a profile of the consumer's interests and preferences. Preferences may include particular brands, countries of origin, vintages, package sizes, and classifications such as type of beverage, price range, and market categories and targeted demographics as defined by the product advertisers. By way of example, a consumer purchasing beer might be assigned an interest in American brands of light beer, in the low-to-average price range, and a preference for cases of 12-oz. bottles. A consumer purchasing wine might be assigned an interest in red wines from Spain, with a preference for moderately expensive "reserva" Riojas aged at least 10 years, purchased as individual 750 ml bottles.

Figure 4:
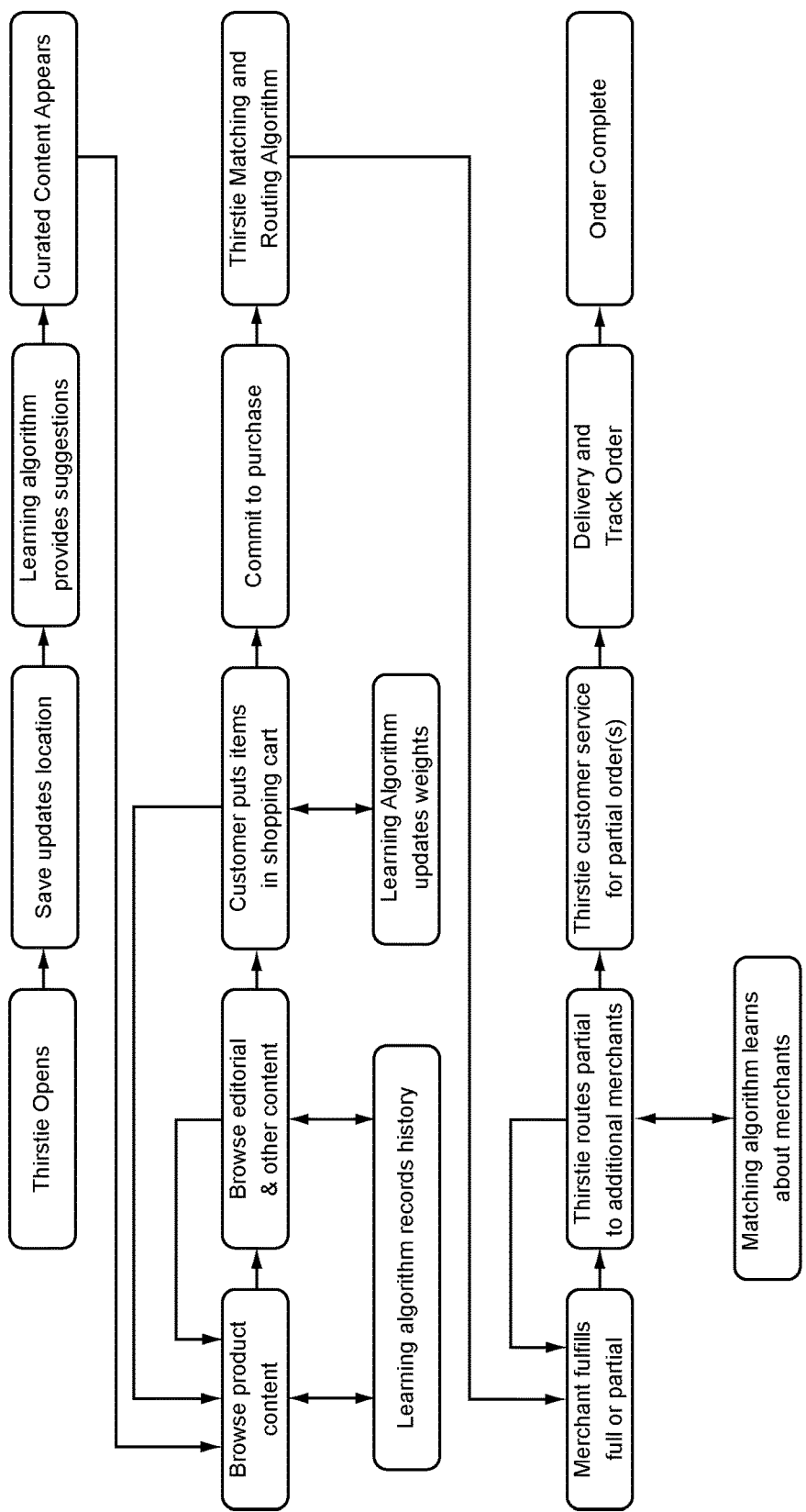
FIG. 4 is a high-level flow chart showing the steps carried out by the algorithms of the invention for an existing customer.

Turning to FIG. 4, when the same consumer returns to the Platform on subsequent visits, the geographic location is checked, and updated if necessary. Based on the recorded browsing history and weighted preferences ("preference parameters") of the consumer, product choices and curated content are displayed which the learning module has determined are likely to be of interest. A regular customer, on repeated visits, may for example be observed to have a preferred vineyard or region, or alternatively may be observed to purchase similar wines from a variety of vineyards and regions. Over time, seasonal and holiday preferences may be detected and recorded. Each customer preference and dimension is associated with a counter, and the learning algorithm will add to the counters (i.e., adjust the weights of these various preference parameters (Algorithm Update Weights)) with each subsequent visit based on the context of the visit and purchase. The current (updated) set of weighted factors will be used to choose curated editorial content and suggested products to be displayed to the consumer as he or she interacts with the Platform. The consumer's interaction with the Platform, and the content and products chosen for display, placement in the shopping cart, and eventual purchase, are monitored and saved, and weights are updated, as described above.

A representative example of how weights are calculated and processed to yield the decision to display a given product or article is provided in the annotated extract of code that follows. Lines of annotation are preceded with "#":

```
BASE_PATH=os.path.realpath(os.path.join(os.path.abspath(os.path.split(inspect.getfile(inspect.currentframe(   ))[0]), '..'))
TEMPLATE_PATH=os.path.realpath(os.path.join(BASE_PATH, 'shared', 'templates'))
STATIC_PATH=os.path.realpath(os.path.join(BASE_PATH, 'shared', 'static'))
REQUEST_HOST=os.environ.get('REQUEST_HOST', None)

# A rule is something that a system administrator or power business user maintains and updates.
# Rules can also be updated by automated system processes that parse overall system data in the future.

class rule:
    weight=0
    contextKey=0
    counter=0
    preferenceToUpdate=preference( )
    def __init__(self, weight, contextKey, counter, preferenceToUpdate):
        self.contextKey=contextKey
        self.weight=weight
        self.counter=counter
        self.preferenceToUpdate=preferenceToUpdate
def createContextKey(keys):
    contextKey=''
    hashOfContextKey=''
    keys=orderKeys( ) # orders the context keys in alphabetical order
    for x in keys:
        contextKey=contextKey+"//"+x.name+"-"
    hashOfContextKey=hashOfContexts(contextKey) # create a hash map of the key
    return hashOfContextKey
def loadRules(connection):
    rawRules=connection('select contextKey, rulePreference, weight from rules order by relevence descending')
    rules=[ ]
    for x in rawRules:
rules[x['contextKey']].add(x['weight' ],x['contextKey'],x[''],x['rulePreference'])
timeofpurchase=['holiday', 'promotion', 'free', 'random']
applications=['mainweb', 'partnerweb', 'ios', 'andriod', 'watch', 'winefridgesensor', 'other']
knownCustomerDrivers=['athome', 'ontheroad', 'attheoffice', 'atfriendsplace', 'autoalert', 'other'] # is database driven and this expands over time
knownSections=['blog', 'productdetail', 'pomotionalpage', 'other'] # is database driven and this expands over time
knownActivities=['browse', 'search', 'purchase', 'addtocart', 'landonsite'] # is database driven and this expands over time
class context:
    idOfContext=0
    section=''
    activity=''
    customerDriver=''
    application=''
    distanceFromHome=0
    timeOfYear=''
    urlOrPage=''
    def __init__(self):
        self.section=''
        self.acivity=''
        self.customerDriver=''
        self.application=''
        self.distanceFromHome=0
        self.urlOrPage=''
        self.timeOfYear=''
    def __init__(self, section, activity, customerDriver, application, distanceFromHome, timeOfYear):
        self.section=section
        self.acivity=activity
        self. customerDriver=customerDriver
        self.application=application
        self.distanceFromHome=distanceFromHome
        self.urlOrPage=urlOrPage
        self.timeOfYear=timeOfYear
    def saveCustomerContext(self, connection):
        if self.validateContext( ): # valdates all the inputes are within range of expected values
            worked=connection.updateContext(self.section, self.activity, self.customerDriver, self.application, self.distanceFromHome, self.urlOrPage) # sql to save the context to the database
            if worked:
                return true
            else:
                return createErrorObject(worked)
class preference:
    key1=application=''
    key2=customerDriver=''
    peferedTimeOfYear=''
    preferedPage=''
    preferedProduct=''
    preferedDeliveryTime=''
    count=0
    def __init_(self):
        return
    def __init_(self, application, customerDriver, preferedPage='default', preferedProduct='default', preferedDeliveryTime=30):
        self.application=application
        self. customerDriver=customerDriver
        self.preferedPage=preferedPage
        self. preferedProduct=preferedProduct
        self.preferedDeliveryTime=preferedDeliveryTime
class customerPreferences:
    customerId=0
    preferences=[ ]
    def __init__(self, customerId):
        self.customerId=customerId
        self.preferences=getCustomerPreferences(connection) # loads all current preferences of the customer indexed by application and customerDriver
# record customer activity and weight to add

# This is called via an API from either the Web or Mobile applications.
```

```
# We record the activity and process the preferences for the
Learning Algorithm in an asynchronous manner

def recordCustomerActivity(section, activity, customer-
Driver, application, distanceFromHome, urlOrPage):
    ctx=context(section, activity, customerDriver, applica-
tion, distanceFromHome, urlOrPage)
    try:
    cnx=new connection( )
    ctx.saveCustomerContext( )
    catch Error, err:
    return err
    final:
    close(cnx)
# assign customer preference

# This is the learning background that learns and updates the
customers preferences
# This is the core function that runs continually in the
background as part of a set of daemon processes
# An event scheduler reviews all of the latest activity (stored
by recordCustomerActivity), groups all of the latest cus-
tomer
# activities in an internal of time and sends it to this function
to update preferences.

def updateCustomerPreferences(customer, contextList, sys-
temRules):
    custPref=customerPreferences(customer.customerId)
    customerPreferneces=custPref.customerPreferences
    for ctx in contextList:
    ctxKey=createContextKey(ctx.makeIntoList( ))
    ruleToUse=systemRules[ctxkey]
    if ruleToUse:
        application=ruleToUse.preference.application
        customerDriver=rulesToUse.preference.customerDriver
        applicationPreferences=customerPreferences[applica-
            tion]
        if applicationPreferences:
            preference=applicationPreference[customerDriver]
            if preference:
                preference.preferedPage=ruleToUse.preferedPage
                preference.preferedProduct=
                    ruleToUse.preferedProduct
                preference.preferedDeliveryTime=ruleToUse.
                    preferedDeliveryTime
                preference.timeOfYear=ruleToUse.timeOfYear
                preference.count+=ruleToUse.counter
            else:
                newPreference(ruleToUse)
        else:
            newPreference(ruleToUse)
    def newPreference(customer, ruletoUse):
    pref=preference(ruleToUse.preference)
    pref.save( )
# use customer preference

# This is one of the APIs that uses the customer preference
to show a product or section

def  getRecommendSystemActionForCustomer(self, cus-
tomer, application, customerDriver):
    custPref=customerPreferences(customer.customerId)
    customerPreferneces=custPref.customerPreferences
    applicationPreferences=customerPreferences[applica-
tion]
    preference=applicationPreference[customerDriver]
    if preference==null:
    return 'defaultvalue'
    elif preference:
    return preference.page, preference.product, preference-
        .distance
```

When the consumer commits to a purchase at checkout, the products actually purchased receive additional weighting, as does curated content related to the purchased products. By way of example, when a customer arrives at the local airport and purchases a bottle of vodka through the mobile application, the system may note the customer's location away from home, that they purchased a vodka bottle, and that the customer wanted it delivered within 30 minutes. This information is recorded and is used to weight the preference parameters in the customer's profile, where it indicates a preference for a "welcome home" drink upon the conclusion of a trip. The next time the customer's location is the airport, or at the same distance from home, and the customer open the application, the application may skip preliminary questions and direct them to the vodka page, and it may present a promotion and/or curated content for other "welcome home" drinks.

The Platform then calls on a matching and routing algorithm, implemented by the learning module, to select eligible merchants. Eligible merchants are those merchants who stock the type(s) of beverages preferred by the consumer, are located near (or are able to ship to) the consumer's delivery address, and can fulfill the order in the manner and time frame requested by the consumer. The eligible merchants are ranked according to the degree to which they match preference criteria, including such factors as inventory size for the product type and/or for the consumer's preferred products, range of price points for a given product type, geographical proximity (to reduce shipping costs and transit times), historical performance record, and customer satisfaction ratings.

The Platform may initially select the nearest eligible merchant having a high rank, to whom the consumer's order is forwarded. If the merchant indicates that they cannot fulfill the entire order, within the time frame requested by the consumer, the next-closest (or next-highest-ranked) merchant is offered the order. If no merchant can fulfill the entire order within the time frame, the part of the order unfulfilled by the initially-selected merchant is offered to the next-closest (or next-highest-ranked) merchant. The selection process may continue in this manner, so as to utilize the fewest number of merchants, and, within this numerical limit, to utilize the highest-ranking merchants available.

Merchants may be ranked by price and performance, as well as proximity to the consumer; these criteria may be weighted as desired by the system owner or operator. In preferred embodiments, speed of delivery to the consumer is the most heavily weighted performance factor. In such embodiments, merchants who carry out immediate deliveries themselves, as opposed to shipping on the schedule of a third party, will be highly ranked, and of these, the most proximate to the customer will be most highly ranked. The merchant(s) who agree to fulfill the order are provided with the consumer's account information (typically, a credit card account), and a gateway for payment processing.

The Platform preferably receives from the merchant(s) a confirmation of shipping, and/or package tracking number(s), and preferably also receives delivery confirmation. The Platform may inform the consumer of the progress of the order, including the identity of the merchants, the products each is shipping, and the location (or last known location) of the packages at any given time. A record of the entire transaction is stored, with appropriate security measures, for future use by the learning module. The learning module stores the information received from the merchants, and updates the database as necessary to reflect the pricing, selection, and delivery area. The chosen merchant's performance, in terms of on-time delivery and relative absence of back-ordered items, is scored and entered into the database. The consumer may be queried by the Platform (e.g. via email, or on a subsequent visit to the Platform), and given the opportunity to score the merchant for specific measures of performance and overall customer satisfaction.

The various methods or processes outlined herein may be coded as software that is executable on one or more processors that employ any one of a variety of operating systems or platforms. Additionally, such software may be written using any of a number of suitable programming languages and/or programming or scripting tools or a combination of programming languages, and also may be compiled as executable machine language code or intermediate code that is executed on a framework or a virtual machine. The above descriptions and the referenced drawings are presented for illustrative purposes, and are not intended to be limiting. Modifications and alterations of these exemplary methods and systems will be apparent to those of skill in the art, and are contemplated to be within the scope and spirit of the invention.

We claim:

1. A computer-implemented method of assisting a consumer in the selection and online ordering of alcoholic beverages, via an Internet-connected computer platform, comprising the steps of:
   (a) upon access of the platform by the consumer via a browser, acquiring the consumer's preferred products, preferred product types, and geographic location;
   (b) displaying, via the browser, curated content and product content based on the preferred products, preferred product types, and geographic location;
   (c) generating and displaying via the browser links to web pages related to the curated and product content;
   (d) requesting and receiving the consumer's delivery address, and requesting and receiving information from the consumer regarding whether the consumer is of age to purchase alcoholic beverages in the jurisdiction covered by the delivery address;
   (e) while the consumer is viewing content and clicking on links, updating preference parameters using a learning algorithm, wherein the learning algorithm: assigns weights to products and product characteristics observed to be of interest to the consumer as the consumer is viewing the curated and product content and clicking on the links, and updates the weights as the consumer shows greater or lesser interest during subsequent interactions;
   (f) if a purchase history of the consumer is available, determining product types and products from past purchases, wherein the learning algorithm selects additional products and content for display to the consumer based on at least one of the updated weights and the determined product types and products;
   (g) while the consumer is viewing the curated and product content, presenting via the browser opportunities to purchase the selected additional products and content;
   (h) receiving choices from the consumer from at least one of the displayed curated content, the product content and the selected additional products and content;
   (i) acquiring from the consumer a desired mode and timing of delivery;
   (j) selecting one or more eligible merchants associated with delivery services that serve the consumer's delivery address;
   (k) filtering eligible merchants by one or more criteria selected from the group consisting of: whether the merchant can deliver to the consumer's delivery address, whether the merchant can fulfill an order via the desired mode of delivery, and whether the merchant can fulfill an order meeting the desired timing of delivery during its hours of operation;
   (l) ranking eligible merchants by one or more preference criteria selected from the group consisting of: which merchant has the largest inventory for the preferred product types; which merchant has largest inventory for the preferred products; which merchant has the broadest range of prices for the preferred product types; which merchant has performed best on prior orders; and which merchant is geographically closest to the delivery address;
   (m) selecting an eligible merchant based on the highest ranking in step (l);
   (n) receiving from the eligible merchant an indication that the consumer's choices are available from inventory;
   (o) providing a gateway to allow a transaction of payment to be processed by the selected eligible merchant;
   (p) receiving notice of delivery of the consumer's choices; and
   (q) securely storing the transaction.

2. The computer-implemented method of claim 1, wherein the curated content comprises published content obtained from third party sources.

3. The computer-implemented method of claim 1, wherein the curated content comprises paid advertising.

4. A computer-implemented method of assisting a consumer in the selection and online ordering of alcoholic beverages, via an Internet-connected mobile device, comprising the steps of:
   (a) upon access of the platform by the consumer via the mobile device, acquiring the consumer's preferred products, preferred product types, and geographic location;
   (b) displaying, via the mobile device, curated content and product content based on preferred products, preferred product types, and geographic location;
   (c) generating and displaying, on the mobile device, links to web pages related to the curated and product content;
   (d) requesting and receiving the consumer's delivery address, and requesting and receiving information from the consumer regarding whether the consumer is of age to purchase alcoholic beverages in the jurisdiction covered by the delivery address;
   (e) while the consumer is viewing content and clicking on links, updating preference parameters using a learning algorithm, wherein the learning algorithm: assigns weights to products and product characteristics observed to be of interest to the consumer as the consumer is viewing the curated and product content and clicking on the links, and updates the weights as the consumer shows greater or lesser interest during subsequent interactions;
   (f) if a purchase history of the consumer is available, determining product types and products from past purchases, wherein the learning algorithm selects additional products and content for display to the consumer, based on at least one of the updated weights and the determined product types and products;

(g) while the consumer is viewing curated content, presenting via the mobile device opportunities to purchase the selected additional products and content;

(h) receiving choices from the consumer from at least one of the displayed curated content, the product content and the selected additional products and content;

(i) acquiring from the consumer a desired mode and timing of delivery;

(j) selecting one or more eligible merchants associated with delivery services that serve the consumer's delivery address;

(k) filtering eligible merchants by one or more criteria selected from the group consisting of: whether the merchant can deliver to the consumer's delivery address, whether the merchant can fulfill an order via the desired mode of delivery, and whether the merchant can fulfill an order meeting the desired timing of delivery during its hours of operation;

(l) ranking eligible merchants by one or more preference criteria selected from the group consisting of: which merchant has the largest inventory for the preferred product types; which merchant has largest inventory for the preferred products; which merchant has the broadest range of prices for the preferred product types; which merchant has performed best on prior orders; and which merchant is geographically closest to the delivery address;

(m) selecting an eligible merchant based on the highest ranking in step (l);

(n) receiving from the eligible merchant an indication that the consumer's choices are available from inventory;

(o) providing a gateway to allow a transaction of payment to be processed by the selected eligible merchant;

(p) receiving notice of delivery of the consumer's choices; and (q) securely storing the transaction.

5. The computer-implemented method of claim 4, wherein the curated content comprises published content obtained from third party sources.

6. The computer-implemented method of claim 4, wherein the curated content comprises paid advertising.

7. A non-transitory computer-readable medium storing instructions executable by a computer platform, that cause the computer platform to perform a method comprising the steps of:

(a) upon access of the platform by the consumer via a browser, acquiring the consumer's preferred products, preferred product types, and geographic location;

(b) displaying, via the browser, curated content and product content based on the preferred products, preferred product types, and geographic location;

(c) generating and displaying via the browser links to web pages related to the curated and product content;

(d) requesting and receiving the consumer's delivery address, and requesting and receiving information from the consumer regarding whether the consumer is of age to purchase alcoholic beverages in the jurisdiction covered by the delivery address;

(e) while the consumer is viewing content and clicking on links, updating preference parameters using a learning algorithm, wherein the learning algorithm: assigns weights to products and product characteristics observed to be of interest to the consumer as the consumer is viewing the curated and product content and clicking on the links, and updates the weights as the consumer shows greater or lesser interest during subsequent interactions;

(f) if a purchase history of the consumer is available, determining product types and products from past purchases, wherein the learning algorithm selects additional products and content for display to the consumer based on at least one of the updated weights and the determined product types and products;

(g) while the consumer is viewing the curated and product content, presenting via the browser opportunities to purchase the selected additional products and content;

(h) receiving choices from the consumer from at least one of the displayed curated content, the product content and the selected additional products and content;

(i) acquiring from the consumer a desired mode and timing of delivery;

(j) selecting one or more eligible merchants associated with delivery services that serve the consumer's delivery address;

(k) filtering eligible merchants by one or more criteria selected from the group consisting of: whether the merchant can deliver to the consumer's delivery address, whether the merchant can fulfill an order via the desired mode of delivery, and whether the merchant can fulfill an order meeting the desired timing of delivery during its hours of operation;

(l) ranking eligible merchants by one or more preference criteria selected from the group consisting of: which merchant has the largest inventory for the preferred product types;

which merchant has largest inventory for the preferred products; which merchant has the broadest range of prices for the preferred product types; which merchant has performed best on prior orders; and which merchant is geographically closest to the delivery address;

(m) selecting an eligible merchant based on the highest ranking in step (l);

(n) receiving from the eligible merchant an indication that the consumer's choices are available from inventory;

(o) providing a gateway to allow a transaction of payment to be processed by the selected eligible merchant;

(p) receiving notice of delivery of the consumer's choices; and (q) securely storing the transaction.

8. The non-transitory computer-readable medium of claim 7, wherein the curated content comprises published content obtained from third party sources.

9. The non-transitory computer-readable medium of claim 7, wherein the curated content comprises paid advertising.

* * * * *